(12) United States Patent
Vossenkaul et al.

(10) Patent No.: US 7,501,084 B2
(45) Date of Patent: Mar. 10, 2009

(54) METHOD FOR PRODUCING FABRIC-REINFORCED CAPILLARY MEMBRANES, IN PARTICULAR FOR ULTRAFILTRATION

(75) Inventors: Klaus Vossenkaul, Aachen (DE); Stefan Schäfer, Aachen (DE)

(73) Assignee: Koch Membrane Systems GmbH, Aachen (DE)

( * ) Notice: Subject to any disclaimer, the term of this patent is extended or adjusted under 35 U.S.C. 154(b) by 700 days.

(21) Appl. No.: 10/507,262

(22) PCT Filed: Mar. 12, 2002

(86) PCT No.: PCT/EP02/02699

§ 371 (c)(1), (2), (4) Date: Apr. 13, 2005

(87) PCT Pub. No.: WO03/076055

PCT Pub. Date: Sep. 18, 2003

(65) Prior Publication Data

US 2005/0202182 A1    Sep. 15, 2005

(51) Int. Cl.
*B29C 44/04* (2006.01)
*B05D 1/18* (2006.01)

(52) U.S. Cl. .................. 264/45.8; 264/41; 427/355; 118/405

(58) Field of Classification Search ............. 427/355, 427/430.1, 434.2, 434.3, 434.6, 434.7, 601; 264/41, 48, 45.8; 118/400, 404, 405, 419, 118/420, DIG. 10, 11, 2, 13, 19
See application file for complete search history.

(56) References Cited

U.S. PATENT DOCUMENTS

| | | | |
|---|---|---|---|
| 2,456,650 A | 12/1948 | Ryan | |
| 3,494,121 A | 2/1970 | Bohrer | |
| 4,061,821 A | 12/1977 | Hayano et al. | |
| 4,579,079 A | 4/1986 | Nundy | |
| 5,168,005 A | 12/1992 | Keating et al. | |
| 5,395,468 A * | 3/1995 | Juliar et al. | 156/169 |
| 5,472,607 A | 12/1995 | Mailvaganam et al. | |
| 5,914,039 A | 6/1999 | Mahendran et al. | |
| 6,354,444 B1 | 3/2002 | Mahendran et al. | |
| 2003/0098275 A1 | 5/2003 | Mahendran et al. | |
| 2005/0051479 A1 | 3/2005 | Mahendran et al. | |
| 2005/0205488 A1 | 9/2005 | Shinada et al. | |

FOREIGN PATENT DOCUMENTS

| | | |
|---|---|---|
| DE | 2 222 714 | 12/1972 |
| GB | 1 540 937 | 2/1979 |
| GB | 2 048 726 | 12/1980 |
| WO | WO 93 18219 | 9/1993 |

* cited by examiner

*Primary Examiner*—Philip C Tucker
*Assistant Examiner*—Robert J Grun
(74) *Attorney, Agent, or Firm*—Faegre & Benson LLP

(57) ABSTRACT

The invention relates to a method for producing fabric-reinforced capillary membranes, particularly for ultrafiltration, in which a fabric tube (1) is coated with a polymer solution and is guided through a precipitation bath (6), where the polymer solution is converted into a microporous layer in the precipitation bath (6), and a membrane that is reinforced by the fabric tube is formed. According to the invention, the fabric tube coated with the polymer solution passes through the precipitation bath (6) from top to bottom, without mechanical contact, and exits through a nozzle (7) at the bottom. Liquid flows out of the nozzle (7), which liquid exerts a tensile force stabilizing the course of the coated fabric tube, on the capillary membrane (8) leaving the precipitation bath.

11 Claims, 1 Drawing Sheet

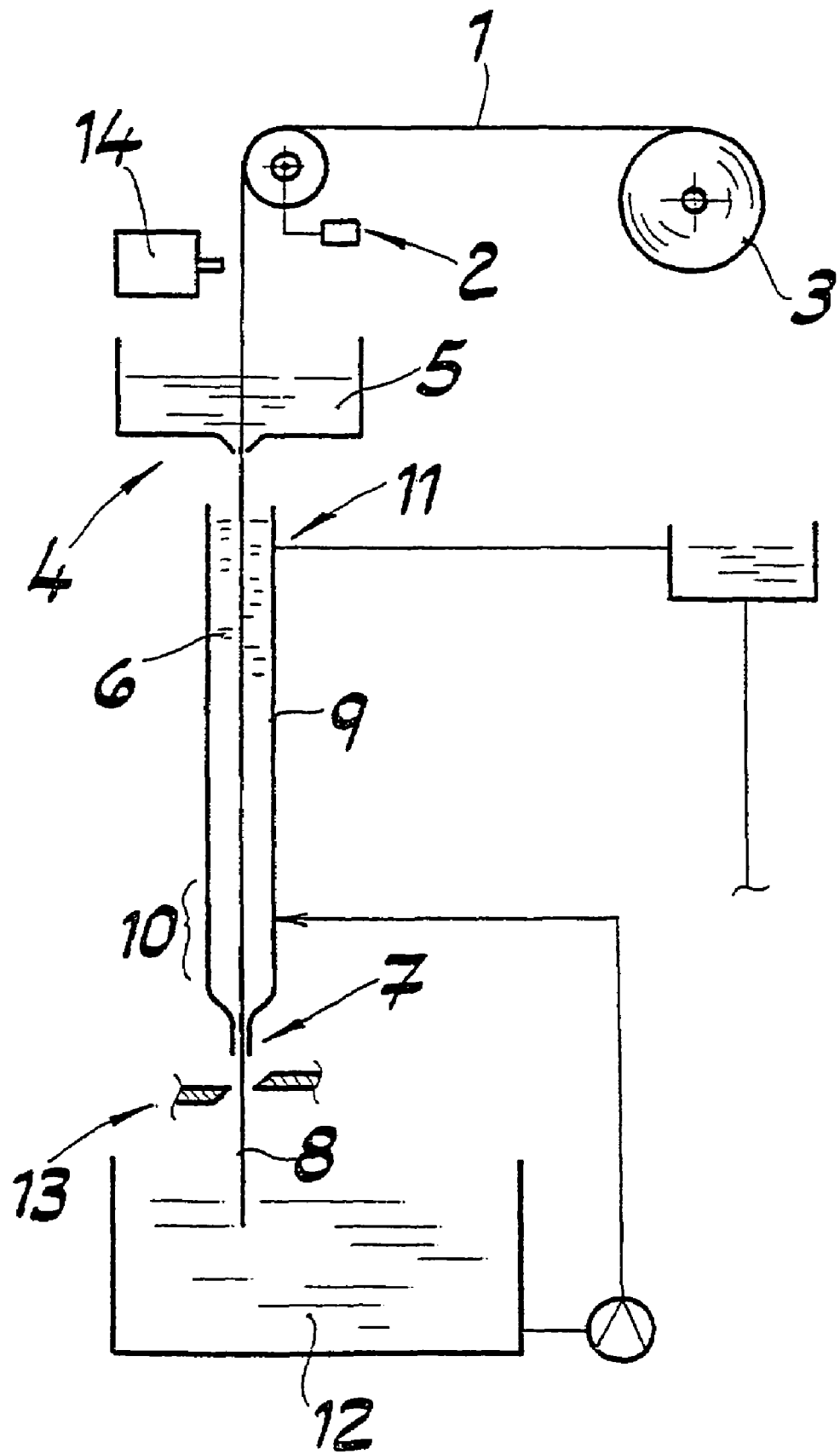

METHOD FOR PRODUCING FABRIC-REINFORCED CAPILLARY MEMBRANES, IN PARTICULAR FOR ULTRAFILTRATION

CROSS REFERENCE TO RELATED APPLICATIONS

Applicants claim priority under 35 U.S.C. §365 of PCT/EP02/02699 filed on Mar. 12, 2002. The international application under PCT article 21(2) was not published in English.

The object of the invention is a method for producing fabric-reinforced capillary membranes, particularly for ultrafiltration, in which a fabric tube is coated with a polymer solution and is guided through a precipitation bath, where the polymer solution is converted into a microporous layer in the precipitation bath, and a membrane that is reinforced by the fabric tube is formed.

In a method known from U.S. Pat. No. 4,061,821, from which the invention proceeds, a fabric tube coated with a polymer solution is drawn through a precipitation bath, where the fabric tube is guided on deflection rollers in the precipitation bath. The sensitive surface of the coated fabric tube is damaged by the contact on the deflection rollers. In particular, micropores in the outer skin of the membrane, which are formed in the precipitation bath by means of phase inversion of the polymer solution, are destroyed by the mechanical contact and deflection of the fabric tube. The known method is unsuitable for the production of ultrafiltration membranes. At most, microfiltration membranes, which have more open pores and a significantly softer structure than ultrafiltration membranes, can be produced using the method.

The invention is based on the task of developing the method for the production of fabric-reinforced capillary membranes in such a manner that the membrane surface is not exposed to any mechanical stresses in the precipitation bath.

This task is accomplished, in the method described initially, according to the invention, in that the fabric tube coated with the polymer solution passes through the precipitation bath from top to bottom, without mechanical contact, and exits through a nozzle at the bottom, whereby liquid flows out of the nozzle, which liquid exerts a tensile force stabilizing the course of the coated fabric tube, on the capillary membrane leaving the precipitation bath. In the nozzle, the capillary membrane is centered by means of the liquid that flows off in ring shape around the membrane. In this connection, the liquid exerts a force directed in the advancing direction, which makes it possible for the membrane to pass through the precipitation bath at a pre-determined speed. The tensile force can be controlled by means of the flow velocity at which the liquid flows out of the nozzle.

An advancing device that engages the semi-permeable membrane layer of the capillary membranes is not required in the method according to the invention, so that damage to the sensitive membrane layer is precluded. Preferably, the fabric tube is drawn off from a supply roller by means of an advancing drive that can be regulated, and passed to a device for coating the fabric tube arranged behind the advancing drive in the transport direction. The speed at which the fabric tube is guided through the subsequent precipitation bath can be controlled by means of the advancing drive. The mechanical contact connected with the advancing process takes place before the fabric tube is coated with the polymer solution.

According to a preferred embodiment of the method according to the invention, the fabric tube coated with the polymer solution passes through a pipe arranged vertically, which contains the precipitation bath and has a nozzle-shaped narrowing at its lower end.

In the precipitation bath, the polymer of the coating, dissolved in a solvent, is converted to a solid material, whereby the solvent passes over into the precipitation bath and leaves micropores in the polymer. An accumulation of the solvent in the precipitation bath impairs the precipitation, which is also referred to as phase inversion in the field of membrane production. In addition, pre-determined temperatures must be maintained during the precipitation process. According to a preferred embodiment of the invention, precipitation agent is supplied to the pipe in an application amount that is sized in such a way that limit values for the temperature and/or the permissible solvent concentration can be maintained in the precipitation bath, whereby merely a partial stream of the precipitation agent supplied to the pipe flows out through the nozzle-shaped narrowing at the lower end of the pipe, and the other part of the supplied precipitation agent is drawn off from the pipe at a different location. The precipitation agent can, for example, be supplied at a lower pipe segment, whereby an overflow is drawn off at the upper end of the pipe.

The capillary membrane leaving the precipitation bath can be passed to a post-precipitation bath, which is arranged below the precipitation bath, for further conditioning, without contact of the membrane surface. It is practical if the capillary membrane is already cut to length after it leaves the precipitation bath.

Using the method according to the invention, it is also easily possible to produce capillary membranes that are open only at one end, and closed at the other end. The production of this membrane type takes place in simple manner, in that the fabric tube is closed in pre-determined segments, before it is coated or after it leaves the precipitation bath, and that the membrane tube leaving the precipitation bath is cut to measure, in such a manner that capillary membranes each having an open and a closed end are formed. The fabric tube can also be closed by means of thermal bonding or ultrasound bonding. Another possibility of closing consists of injecting a polymer solution into the fabric tube, which forms a solid plug in the precipitation bath and/or in a post-precipitation bath.

In the following, the method according to the invention will be explained using a drawing that merely represents an exemplary embodiment. The single FIGURE shows a method schematic for the production of fabric-reinforced capillary membranes, particularly for ultrafiltration. Ultrafiltration membranes are microporous filter media whose pores are so small that they represent a barrier not only for particles of any type and shape, but also for all microorganisms, i.e. bacteria, parasites, and viruses. The active layer of the membranes, also called the semi-permeable layer, consists of organic polymers, e.g. polysulfone, polyethylene, polypropylene, and the like. The membranes generally possess an outside diameter of less than 5 mm and are referred to as capillary membranes, frequently also as hollow-fiber membranes. A diameter range between 0.5 and 3 mm is preferred.

In the case of the method shown in the FIGURE, a fabric tube 1 is drawn off from a supply roller 3, by means of an advancing drive 2 that can be regulated, and passed to a device 4 for coating the fabric tube arranged behind the advancing drive 2 in the transport direction. Products that are known from the production of cable sheathing and are available as mass-production products can be used as the fabric tube 1. After an external coating with a polymer solution 5, the coated fabric tube is guided through a precipitation bath 6, where the polymer solution is converted into a microporous membrane layer, and a membrane that is reinforced by the fabric tube 1 is formed. The fabric tube 1 passes through the precipitation bath 6 from top to bottom, without mechanical contact, and exits through a nozzle 7 at the bottom. Liquid also flows out of the nozzle 7, which liquid exerts a tensile force stabilizing the course of the coated fabric tube, on the capillary membrane 8 leaving the precipitation bath. The liquid flowing out of the nozzle 7 causes a straight run of the fabric tube 1 in the precipitation bath 6, without mechanical contact and without deflections.

The precipitation bath 6 is arranged in a vertical pipe 9, which has a narrowing forming the nozzle 7, at its lower end. The precipitation agent, in most cases water, is for example supplied at a lower pipe segment 10, whereby merely a partial stream flows out through the nozzle-shaped narrowing 7 at the lower end of the pipe 9, and an overflow 11 is drawn off at the upper end of the pipe 9. The application amount is sized in such a way that limit values for the temperature and/or the permissible solvent concentration can be maintained in the precipitation bath 6, and in this regard, a sufficient exchange of the precipitation agent is guaranteed.

The capillary membrane 8 leaving the precipitation bath 6 is passed to a post-precipitation bath 12, e.g. a water bath, for further conditioning, without contact of the membrane surface. In this connection, it can be cut to length by means of a cutting device 13 arranged between the precipitation bath 6 and the water bath 12.

Using the method according to the invention, it is also possible to produce capillary membranes that are open at one end, and closed at the other end. For the production of capillary membranes open on one end, the fabric tube 1 is closed in pre-determined segments, before it is coated or after it leaves the precipitation bath 6, for example by means of an ultrasound bonding device 14, and the membrane tube leaving the precipitation bath 6 is cut to measure, in such a manner that capillary membranes each having an open and a closed end are formed.

Using the method according to the invention, not only capillary membranes for ultrafiltration, but also for other membrane separation methods, such as microfiltration, nanofiltration, and the like, can be produced.

The invention claimed is:

1. A method for producing fabric-reinforced capillary membranes, in which a fabric tube is coated with a polymer solution and is guided through a precipitation bath where the polymer solution is converted into a microporous layer and a capillary membrane that is reinforced by the fabric tube is formed, wherein the fabric tube coated with the polymer solution passes through the precipitation bath from top to bottom, without mechanical contact or exposure to mechanical stresses other than liquid tensile forces, and exits through a nozzle at the bottom, whereby liquid flows out of the nozzle, which liquid exerts a tensile force stabilizing a course of the coated fabric tube on the capillary membrane leaving the precipitation bath.

2. The method as recited in claim 1, wherein the fabric tube is drawn off from a supply roller by means of an advancing drive that can be regulated, and passed to a device for coating the fabric tube arranged behind the advancing drive in a transport direction.

3. The method as recited in claim 1, wherein the fabric tube coated with the polymer solution passes through a pipe arranged vertically, which contains the precipitation bath and has a nozzle-shaped narrowing at a lower end of the pipe.

4. The method as recited in claim 3, wherein a precipitation agent is supplied to the pipe in an application amount that is sized in such a way that limits values for a temperature and/or a permissible solvent concentration maintained in the precipitation bath, whereby merely a partial stream of the precipitation agent supplied to the pipe flows out through the nozzle-shaped narrowing at the lower end of the pipe, and another part of the supplied precipitation agent is drawn off from the pipe at a different location.

5. The method as recited in claim 4, wherein the precipitation agent is supplied at a lower pipe segment, and an overflow is drawn off at an upper end of the pipe.

6. The method as recited in claim 1, wherein the capillary membrane leaving the precipitation bath is passed to a post-precipitation bath, for further conditioning, without mechanical contact of a surface of the capillary membrane.

7. The method as recited in claim 1, wherein that the capillary membrane is cut to length after it leaves the precipitation bath.

8. The method as recited in claim 1, wherein the fabric tube is closed at pre-determined intervals, before it is coated or after it leaves the precipitation bath, and that the membrane tube leaving the precipitation bath is cut to measure, in such a manner that capillary membranes each having an open and a closed end are formed.

9. The method as recited in claim 8, wherein the fabric tube can also be closed by means of thermal bonding or ultrasound bonding, or that for this purpose, a polymer solution is injected into the fabric tube, which solution forms a solid plug in the precipitation bath and/or in a post-precipitation bath.

10. A method for producing fabric-reinforced capillary membranes, in which a fabric tube is coated with a polymer solution and is guided through a precipitation bath where the polymer solution is converted into a microporous layer and a capillary membrane that is reinforced by the fabric tube is formed, wherein the fabric tube coated with the polymer solution passes through the precipitation bath from top to bottom, without mechanical contact, and exits through a nozzle at the bottom, whereby liquid flows out of the nozzle, which liquid exerts a tensile force stabilizing a course of the coated fabric tube on the capillary membrane leaving the precipitation bath, wherein the fabric tube coated with the polymer solution passes through a pipe arranged vertically, which contains the precipitation bath and has a nozzle-shaped narrowing at a lower end of the pipe, and wherein precipitation agent is supplied to the pipe in an application amount that is sized in such a way that limits values for a temperature and/or a permissible solvent concentration maintained in the precipitation bath, whereby merely a partial stream of the precipitation agent supplied to the pipe flows out through the nozzle-shaped narrowing at the lower end of the pipe, and another part of the supplied precipitation agent is drawn off from the pipe at a different location.

11. A method for producing fabric-reinforced capillary membranes, in which a fabric tube is coated with a polymer solution and is guided through a precipitation bath where the polymer solution is converted into a microporous layer and a capillary membrane that is reinforced by the fabric tube is formed, wherein the fabric tube coated with the polymer solution passes through the precipitation bath from top to bottom, without mechanical contact, and exits through a nozzle at the bottom, whereby liquid flows out of the nozzle, which liquid exerts a tensile force stabilizing the course of the coated fabric tube on the capillary membrane leaving the precipitation bath, wherein the capillary membrane leaving the precipitation bath is passed to a post-precipitation bath, for further conditioning, without mechanical contact of a surface of the membrane.

* * * * *